United States Patent

Patrick et al.

[11] Patent Number: 6,060,136
[45] Date of Patent: May 9, 2000

[54] HIGH MODULUS OXYGEN-PERMEABLE MULTILAYER FILM

[75] Inventors: Ray Ernest Patrick, Pelzer; Mendy Joyce Walden, Moore, both of S.C.

[73] Assignee: Cryovac, Inc., Duncan, S.C.

[21] Appl. No.: 08/889,000

[22] Filed: Jul. 7, 1997

Related U.S. Application Data

[63] Continuation of application No. 08/597,790, Feb. 7, 1996, abandoned, which is a continuation-in-part of application No. 08/542,494, Oct. 13, 1995, Pat. No. 5,962,092.

[51] Int. Cl.[7] .......................... B32B 25/16; B32B 27/32; B65B 9/06
[52] U.S. Cl. .................. 428/35.2; 428/517; 426/127; 53/451; 53/455
[58] Field of Search .................... 428/213, 515, 428/516, 517, 910, 35.2, 34.9, 35.4, 36.7, 494; 426/127, 129, 410; 53/451, 455

[56] References Cited

U.S. PATENT DOCUMENTS

| | | | |
|---|---|---|---|
| 2,956,383 | 10/1960 | Gausman | 53/124 |
| 3,340,129 | 9/1967 | Grevich | 156/498 |
| 3,574,642 | 4/1971 | Weinke | 99/174 |
| 3,703,796 | 11/1972 | Inoue et al. | 53/180 |
| 4,103,473 | 8/1978 | Bast et al. | 53/180 |
| 4,506,494 | 3/1985 | Shimoyama et al. | 53/551 |
| 4,532,752 | 8/1985 | Taylor | 53/451 |
| 4,532,753 | 8/1985 | Kovacs | 53/451 |
| 4,571,926 | 2/1986 | Scully | 53/525 |
| 4,589,247 | 5/1986 | Tsuruta et al. | 53/550 |
| 4,746,689 | 5/1988 | Sullivan | 523/348 |
| 4,876,146 | 10/1989 | Isaka et al. | 428/347 |
| 4,897,274 | 1/1990 | Candida et al. | 426/127 |
| 5,206,075 | 4/1993 | Hodgson, Jr. | 428/216 |
| 5,241,031 | 8/1993 | Mehta | 526/348.1 |
| 5,278,236 | 1/1994 | Lai et al. | 526/348.5 |
| 5,278,272 | 1/1994 | Lai et al. | 526/348.5 |
| 5,332,616 | 7/1994 | Patrick et al. | 428/218 |
| 5,427,807 | 6/1995 | Chum et al. | 426/393 |
| 5,491,019 | 2/1996 | Kuo | 428/213 |
| 5,523,136 | 6/1996 | Fisher et al. | 428/35.2 |

FOREIGN PATENT DOCUMENTS

| | | |
|---|---|---|
| 0 265 544 A1 | 4/1988 | European Pat. Off. . |
| 0 710 546 A1 | 5/1996 | European Pat. Off. . |
| 2705053 A1 | 5/1993 | France . |
| 58-102752 | 6/1983 | Japan . |
| 1334616 | 10/1973 | United Kingdom . |
| WO 90/03414 | 4/1990 | WIPO . |
| WO 91/06426 | 5/1991 | WIPO . |
| WO 93/03093 | 2/1993 | WIPO . |

OTHER PUBLICATIONS

L. Wild et al, "Determination of Branching Distributions in Polyethylene and Ethylene Copolymers", J. Poly. Sci., vol. 20, (1982) pp. 441–455.

Brant et al, "Modified Atmosphere Packaging Quality: The Value of Metallocene Resins", Exxon Chemical Company publication, (believed to be Oct. 1995) pp. 1–11.

(List continued on next page.)

*Primary Examiner*—Paul Thibodeau
*Assistant Examiner*—D. Lawrence Tarazano
*Attorney, Agent, or Firm*—Daniel B. Ruble; David G. Burleson; Leigh P. Gregory

[57] ABSTRACT

A multilayer film has a first outer layer, an inner layer, and a second outer layer. The first outer layer comprises a homogeneous ethylene/alpha-olefin copolymer. The inner layer comprises a thermoplastic elastomer. The second outer layer comprises a second ethylene/alpha-olefin copolymer. The inner layer is between the first outer layer and the second outer layer, and is chemically different from the first outer layer and the second outer layer. The multilayer film has an $O_2$-transmission rate of from about 500 to 50,000 $cc/m^2$ 24hr STP, and a modulus of at least 60,000 psi. The multilayer film is especially useful for the packaging of $O_2$-sensitive products, such as produce. The high modulus of the film enhances its performance in form-fill-and-seal operations.

26 Claims, 3 Drawing Sheets

OTHER PUBLICATIONS

Advertisement from "The Packer/California Lettuce" (Aug. 14, 1995), pp. 9, Vance Publication.

Product brochure from ICI Surfactants, "Atmer Polymer Additives".

"Atmer 8112", ICI Polymer Additives, Product Information Bulletin (Aug. 1991) (Aug. 1991).

"Atmer 8174", ICI Surfactants, Product Information Bulletin (Reb. Aug. 1993).

Technical data sheet, "Polybatch AF 1085", A. Schulman, Inc., Akron, Ohio (Sep. 1993), pp. 1–2.

"Polybatch AF 1085", A. Schulman Inc., Akron, Ohio, pp. 1–2 (Sep. 1993).

D.J. Michiels, SPE Polyolefins IX "Fresh Produce: Packaging Film's Fastest Growing Market", (Feb. 1995).

Monty Bates, Evolving Package Structure Technologies for Modified Atmosphere Product Packaging, MAPACK Conference (Oct. 19, 1995 through Oct. 20, 1995), Institute of Packaging Professionals, Anaheim, CA.

HIGH MODULUS OXYGEN-PERMEABLE MULTILAYER FILM

CROSS-REFERENCE TO RELATED APPLICATION

This is a continuation of U.S. patent application Ser. No. 08/597,790, filed Feb. 7, 1996, abandoned pursuant to the filing of this application, which is a continuation-in-part of U.S. patent application Ser. No. 08/542,494, filed Oct. 13, 1995, now U.S. Pat. No. 5,962,092.

FIELD OF THE INVENTION

The present invention relates to multilayer films, particularly multilayer films suitable for use as packaging films. The present invention is particularly directed to multilayer films and packaged products using same, wherein the film has a relatively high modulus and a relatively high $O_2$-transmission rate. The present invention is also directed to the use of such films in the packaging of $O_2$-sensitive products, such as lettuce, etc.

BACKGROUND OF THE INVENTION

Multilayer films have been utilized for the packaging of "oxygen-sensitive products", such as lettuce, i.e., products which exhibit lower shelf life in the presence of either too much oxygen in the package, or too little oxygen in the package. In such multilayer films, the $O_2$-transmission rate, and even the $CO_2$-transmission rate, are of primary importance, especially in the packaging of such $O_2$-sensitive products as vegetables, fruits, and cheese. For example, in the packaging of precut lettuce, the presence of too much $O_2$ in the package results in an enzymatic browning of cut surfaces, known as pink ribbing. On the other hand, if the concentration of $O_2$ in the package is too low, the lettuce tends to spoil due to anaerobiosis.

One of the commercially-available multilayer films which has been used in the packaging of oxygen-sensitive products has an outer heat-resistant layer of an elastomer, such a styrene-butadiene copolymer, and an outer sealant layer of a metallocene-catalyzed ethylene/alpha-olefin copolymer. Although this multilayer film exhibits desired $O_2$ and $CO_2$ transmission rates, as well as a desirable stiffness, this multilayer film has been found to exhibit an undesirable level of "curl," thereby exhibiting less-than-desired machinability performance. In form-fill-and-seal machinery ("FFS" machinery), curl causes film threadup problems as well as film tracking problems. Furthermore, in FFS packaging, the presence of the outer heat-resistant elastomer layer restricts package formation to a fin-type backseal, as the metallocene-catalyzed outer film layer does not seal well to the heat-resistant elastomer layer.

It has also been found that there is a pervasive belief among many skilled in the packaging of a variety of products that a heat seal cannot be made using a film having both outer layers of a low melt point polyethylene-based polymer, i.e., including both polyethylene homopolymer as well as ethylene/alpha-olefin copolymers, as it is believed that the hot bar will tend to stick to the film during sealing.

It would be desirable to provide a film which exhibits desirable $O_2$ and $CO_2$ transmission rates and a desirable stiffness, while reducing or eliminating the curl of the film, as well as providing a film which is suitable to a lap-type backseal for FFS packaging, using constant heat as opposed to impulse heating. Since fogging of the package is also a common problem in the packaging of produce and other food products, it would also be desirable that the film resist fogging, in order to provide the consumer with a clear view of the contents of the package, and in order to provide a more aesthetically appealing package, especially in retail applications where product presentation is important. However, those surface active agents which are effective antifog agents tend to interfere with ink adhesion to the film. This detrimental effect occurs because the antifog agent blooms to the outside surface of the package and interferes with the adhesion of the ink to the film. This detriment is significant for packages designed for consumer end use, as the consumer does not find such a package to be appealing if the ink is smeared or if the ink comes off onto other articles or the consumer. Thus, it would be also desirable to provide the film with an antifog agent on an outer film surface which forms the inside surface of the package, while also providing adequate adhesion for printing on an outer surface of the film, which outer surface serves as the outside surface of the package.

SUMMARY OF THE INVENTION

It has been discovered that curl can be eliminated by providing a film with outer layers of ethylene/alpha-olefin copolymer and an inner layer of elastomer, such as styrene/butadiene copolymer. Furthermore, by providing both outer layers of the film with ethylene/alpha-olefin copolymer, a lap-type backseal can be used in FFS type packaging. It has also been discovered that the homogeneous ethylene/alpha-olefin copolymers (e.g., metallocene-catalyzed ethylene/alpha-olefin copolymers) can be provided on one or both outer film layers, in order to provide the film with further enhanced sealing characteristics.

As a first aspect, the present invention pertains to a multilayer film comprising a first outer layer, a second outer layer, and an inner layer. The first outer layer comprises a first ethylene/alpha-olefin copolymer, which, in turn, comprises a homogeneous copolymer. The second outer layer comprises a second ethylene/alpha-olefin copolymer. The inner layer comprises a thermoplastic elastomer. The inner layer is between the first outer layer and the second outer layer, and the inner layer is chemically different from the first outer layer and the second outer layer. The multilayer film has an $O_2$-transmission rate of from about 500 to 50,000 cc/m² 24hr STP; more preferably, from 1,000 to 20,000 cc/m2 24 hr STP; still more preferably, from about 2,000 to 10,000 cc/m2 24 hr STP. The multilayer film has a modulus of at least 60,000 psi; more preferably, from about 60,000 to 150,000 psi; still more preferably, from about 70,000 to 120,000 psi, and yet still more preferably, from about 80,000 to 100,000 psi.

Preferably, the first outer layer further comprises a surface-active agent component comprising at least one member selected from the group consisting of ester of aliphatic alcohol, polyether, polyhydric alcohol, ester of polyhydric aliphatic alcohol, and polyethoxylated aromatic alcohol, wherein the surface-active component is present over the entire outside surface of the first outer layer.

Preferably, the first outer layer has a thickness of from about 0.3 to 0.8 mil, the inner layer has a thickness of from about 0.1 to 1 mil, the second outer layer has a thickness of from about 0.3 to 0.8 mil, and the multilayer film has a total thickness of from about 1 to 3 mils. More preferably, the inner layer has a thickness of from about 0.4 to 0.8 mil.

It has been found that the curl problem can be reduced or eliminated by providing a film having a symmetrical cross-section. That is, by providing a multilayer film having a cross section which is symmetrical in terms of layer arrangement, layer thickness, and layer chemical composition, curl is reduced or eliminated. Of course, some variation, i.e., lack of symmetry, can be present, while still substantially reducing or eliminating the amount of curl which would otherwise result without substantial symmetry. For example, one outer layer can comprise a homogeneous ethylene/alpha-olefin copolymer while the other outer layer comprises a heterogeneous ethylene/alpha-olefin copolymer. One outer layer may also contain an antifog agent, while the other layer does not. Such minor variations in the cross-sectional symmetry of the film have not been found to have a particularly detrimental effect on the curl level exhibited by the film. More severe variations are also possible, while obtaining a relatively low curl level. However, the presence of only two layers, such as a first layer comprising an ethylene/alpha-olefin copolymer and a second layer comprising a styrene/butadiene elastomeric copolymer, has been found to exhibit substantial curl, and it is believed that it is the lack of symmetry of such a film which is the cause of the undesirable level of curl.

Preferably, the homogeneous ethylene/alpha-olefin copolymer in the first outer layer is a first homogeneous ethylene/alpha-olefin copolymer, and the second outer layer comprises a second homogeneous ethylene/alpha-olefin copolymer. More preferably, the first homogeneous ethylene/alpha-olefin copolymer has a density of less than about 0.915 grams per cubic centimeter, and the second homogeneous ethylene/alpha-olefin copolymer has a density of less than about 0.915 grams per cubic centimeter. Still more preferably, the first homogeneous ethylene/alpha-olefin copolymer comprises ethylene mer in an amount of from about 99 to 80 weight percent ethylene, based on copolymer weight, and a first alpha-olefin mer in an amount of from about 1 to 20 weight percent, based on copolymer weight, wherein the first alpha-olefin mer comprises at least one member selected from the group consisting of $C_4$, $C_6$, and $C_8$; and, the second homogeneous ethylene/alpha-olefin copolymer comprises ethylene mer in an amount of from about 99 to 80 weight percent ethylene, based on copolymer weight, and a second alpha-olefin mer in an amount of from about 1 to 20 weight percent, based on copolymer weight, and wherein the second alpha-olefin mer comprises at least one member selected from the group consisting of $C_4$, $C_6$, and $C_8$. Still more preferably, the first homogeneous ethylene/alpha-olefin copolymer comprises ethylene mer in an amount of from about 95 to 85 weight percent, based on copolymer weight, and a first alpha-olefin mer in an amount of from about 5 to 15 weight percent, based on copolymer weight, wherein the first alpha-olefin mer comprises at least one member selected from the group consisting of $C_8$, and a blend of $C_6$ and $C_4$; and the second homogeneous ethylene alpha-olefin copolymer comprises ethylene mer in an amount of from about 95 to 85 weight percent, based on copolymer weight, and a second alpha-olefin mer in an amount of from about 5 to 15 weight percent, based on copolymer weight, wherein the second alpha-olefin mer comprises at least one member selected from the group consisting of $C_8$ and a blend of $C_6$ and $C_4$; and the multilayer film has an $_{O2}$-transmission rate of from about 2,000 to 10,000 cc/m$^2$/24 hr STP.

Preferably, the inner layer comprises styrene-containing polymer. The inner layer can comprise a blend of styrene homopolymer and styrene/butadiene block copolymer. Preferably, styrene homopolymer is present in an amount of from about 5 to 50 weight percent, based on layer weight; more preferably, from about 10 to 30 weight percent; still more preferably, from about 10 to 20 weight percent; preferably, the balance of the inner layer is styrene/butadiene block copolymer.

The inner layer can be a first inner layer, with the film further comprising a second inner layer and a third inner layer. The second inner layer comprises a first polyolefin and the third inner layer comprises a second polyolefin, with the first inner layer being between the second inner layer and the third inner layer. Preferably, the first polyolefin comprises at least one member selected from the group consisting of propylene homopolymer, and propylene/ethylene copolymer containing ethylene mer in an amount of from about 0.1 to 6 weight percent; preferably, the second polyolefin comprises at least one member selected from the group consisting of propylene homopolymer, and propylene/ethylene copolymer containing ethylene mer in an amount of from about 0.1 to 6 weight percent.

Preferably, the inner layer is a first inner layer comprising a first styrene-containing polymer, with the multilayer film further comprising a second inner layer comprising polyolefin, and a third inner layer comprising a second styrene-containing polymer. Preferably, the second inner layer of polyolefin is between the first inner layer and the third inner layer; preferably, the polyolefin comprises at least one member of the group consisting of propylene homopolymer, and propylene/ethylene copolymer containing ethylene mer in an amount of from about 0.1 to 6 weight.

Preferably, the styrene-containing polymer comprises styrene/butadiene copolymer. Preferably, the styrene/butadiene copolymer comprises styrene/butadiene block copolymer comprising butadiene mer in an amount of from about 20 to 40 weight percent, based on block copolymer weight.

As a second aspect, the present invention pertains to a packaged product comprising a product packaged in, i.e., surrounded by, a package comprising a multilayer film according to the present invention. The product comprises at least one member selected from the group consisting of lettuce, cabbage, broccoli, green beans, cauliflower, spinach, kale, carrot, onion, pepper, corn, radish, endive, chard, chicory, radicchio, greens, peas, squash, escarole, brussels sprout, mushroom, melon and berry. Preferably, the multilayer film is a preferred multilayer film according to the present invention. In the packaged product according to the present invention, preferably the multilayer film has a tear notch, so that the package is an easy-open package. Preferably, the package is a sealed pouch having two end seals and a backseal connecting the two end seals. The backseal can be a fin seal or a lap seal.

The $O_2$-sensitive product preferably comprises a cut vegetable or fruit comprising at least one member selected from the group consisting of lettuce, cabbage, broccoli, green beans, cauliflower, spinach, kale, carrot, onion, pepper, corn, radish, endive, chard, chicory, radicchio, greens, peas, squash, escarole, brussels sprout, mushroom, melon and berry. Preferably, the $O_2$-sensitive product comprises a cut vegetable comprising at least one member selected from the group consisting of lettuce, cabbage, broccoli, cauliflower, kale, carrot, onion, radish, endive, chard, chicory, radicchio, and escarole, and the film has an $O_2$-transmission rate of from about 3,000 to 8,000 cc/m$^2$/24 hr STP.

As a third aspect, the present invention is directed to a packaging process for packaging an $O_2$-sensitive product. The process comprises the steps of (A) forwarding a supply of a multilayer film into a vertical form fill and seal apparatus; (B) passing the film over a collar member of the vertical form fill and seal apparatus, so that substantially vertically-oriented edge portions of the film are adjacent one another; (C) forming a longitudinal seal along at least a segment of the adjacent edge portions of the film, to form a sealed tube segment; (D) collapsing a lower end portion of the sealed tube segment; (E) forming a bottom package seal across the collapsed lower end portion of the sealed tube segment, to form a pouch; (F) adding an appropriate quantity of the $O_2$-sensitive product to the pouch; (G) collapsing an upper end portion of the pouch; and (H) forming a top package seal across the collapsed upper end portion to form a sealed pouch containing the oxygen-sensitive product, whereby a package is formed. The multilayer film is a film according to the multilayer film of the present invention, preferably, a preferred multilayer film according to the present invention. The product is an $O_2$-sensitive product as in the packaged product according to the present invention. Preferably, the vertical form fill and seal machine forms, fills, and seals at least 15 packages per minute, without substantial burn through of the film at the seals. Preferably, the film is sealed at a temperature of from about 70° C. to 150° C.

DETAILED DESCRIPTION OF THE INVENTION

As used herein, the term "monomer" refers to a relatively simple compound, usually containing carbon and of low molecular weight, which can react to form a polymer by combination with itself or with other similar molecules or compounds.

As used herein, the term "comonomer" refers to a monomer which is copolymerized with at least one different monomer in a copolymerization reaction, the result of which is a copolymer.

As used herein, the term "polymer" refers to the product of a polymerization reaction, and is inclusive of homopolymers, copolymers, terpolymers, etc.

As used herein, the term "homopolymer" is used with reference to a polymer resulting from the polymerization of a single monomer, i.e., a polymer consisting essentially of a single type of repeating unit.

As used herein, the term "copolymer" refers to polymers formed by the polymerization reaction of at least two different monomers. For example, the term "copolymer" includes the copolymerization reaction product of ethylene and an alpha-olefin, such as 1-hexene. However, the term "copolymer" is also inclusive of, for example, the copolymerization of a mixture of ethylene, propylene, 1-hexene, and 1-octene.

As used herein, the term "copolymerization" refers to the simultaneous polymerization of two or more monomers.

As used herein, terminology employing a "/" with respect to the chemical identity of a copolymer (e.g., "an ethylene/alpha-olefin copolymer"), identifies the comonomers which are copolymerized to produce the copolymer. This terminology, as used herein, refers to the primary comonomer first, followed by the secondary comonomer. The copolymerization is preferably carried out in the presence of more (on a weight percent basis) of the primary comonomer than the secondary comonomer.

As used herein, the phrase "heterogeneous polymer" refers to polymerization reaction products of relatively wide variation in molecular weight and relatively wide variation in composition distribution, i.e., polymers made, for example, using conventional Ziegler-Natta catalysts. Such polymers typically contain a relatively wide variety of chain lengths and comonomer percentages.

As used herein, the phrase "heterogeneous catalyst" refers to a catalyst suitable for use in the polymerization of heterogeneous polymers, as defined above. Heterogeneous catalysts are comprised of several kinds of active sites which differ in Lewis acidity and steric environment. Ziegler-Natta catalysts are heterogeneous catalysts. Examples of Ziegler-Natta heterogeneous systems include metal halides activated by an organometallic co-catalyst, such as titanium chloride, optionally containing magnesium chloride, complexed to trialkyl aluminum and may be found in patents such as U.S. Pat. No. 4,302,565, to GOEKE, et. al., and U.S. Pat. No. 4,302,566, to KAROL, et. al., both of which are hereby incorporated, in their entireties, by reference thereto.

As used herein, the phrase "homogeneous polymer" refers to polymerization reaction products of relatively narrow molecular weight distribution and relatively narrow composition distribution. Homogeneous polymers are useful in various layers of the multilayer film used in the present invention. Homogeneous polymers exhibit a relatively even sequencing of comonomers within a chain, the mirroring of sequence distribution in all chains, and the similarity of length of all chains, and are typically prepared using metallocene, or other single-site type catalysis.

More particularly, homogeneous ethylene/alpha-olefin copolymers may be characterized by one or more methods known to those of skill in the art, such as molecular weight distribution ($M_w/M_n$), composition distribution breadth index (CDBI), and narrow melting point range and single melt point behavior. The molecular weight distribution ($M_w/M_n$), also known as polydispersity, may be determined by gel permeation chromatography. The homogeneous ethylene/alpha-olefin copolymers useful in this invention will have a ($M_w/M_n$) of less than 2.7. Preferably, the ($M_w/M_n$) will have a range of about 1.9 to 2.5. More preferably, the ($M_w/M_n$) will have a range of about 1.9 to 2.3. The CDBI of such homogeneous ethylene/alpha-olefin copolymers will generally be greater than about 70 percent. The CDBI is defined as the weight percent of the copolymer molecules having a comonomer content within 50 percent (i.e., plus or minus 50%) of the median total molar comonomer content. The CDBI of linear polyethylene, which does not contain a comonomer, is defined to be 100%. The CDBI is determined via the technique of Temperature Rising Elution Fractionation (TREF). CDBI determination clearly distinguishes the homogeneous copolymers used in the present invention (narrow composition distribution as assessed by CDBI values generally above 70%) from heterogeneous polymers such as VLDPEs available commercially which generally have a broad composition distribution as assessed by CDBI values generally less than 55%. The CDBI of a copolymer is readily calculated from data obtained from techniques known in the art, such as, for example, temperature rising elution fractionation as described, for example, in Wild et. al., *J. Poly. Sci. Poly. Phys. Ed.,* Vol. 20, p.441 (1982). Preferably, the homogeneous ethylene/alpha-olefin copolymers have a CDBI greater than about 70%, i.e., a CDBI of from about 70% to 99%. In general, the homogeneous ethylene/alpha-olefin copolymers in the multilayer films of the present invention also exhibit a relatively narrow melting point range, in comparison with "heterogeneous copolymers", i.e., polymers having a CDBI of less than 55%. Preferably, the homogeneous ethylene/alpha-olefin copolymers exhibit an essentially singular melting point characteristic, with a peak melting point ($T_m$), as determined by Differential Scanning Colorimetry (DSC), of from about 60° C. to 110° C. Preferably, the homogeneous copolymer has a DSC peak $T_m$ of from about 90° C. to 110° C. As used herein, the phrase "essentially single melting point" means that at least about 80%, by weight, of the material corresponds to a single $T_m$ peak at a temperature within the range of from about 60° C. to 110° C., and essentially no substantial fraction of the material has a peak melting point in excess of about 115° C., as determined by DSC analysis. The presence of higher melting peaks is detrimental to film properties such as haze and compromises the chances for meaningful reduction in the seal initiation temperature of the final film. DSC measurements are made on a Perkin Elmer System 7 Thermal Analysis System. Melting information reported are second melting data, i.e., the sample is heated at a programmed rate of 10° C./min. to a temperature below its critical range. The sample is then reheated (2nd melting) at a programmed rate of 10° C./min.

A homogeneous ethylene/alpha-olefin copolymer can, in general, be prepared by the copolymerization of ethylene and any one or more alpha-olefin. Preferably, the alpha-olefin is a $C_3$–$C_{20}$ a-monoolefin, more preferably, a $C_4$–$C_{12}$ a-monoolefin, more preferably, a $C_4$–$C_8$ a-monoolefin. Still more preferably, the alpha-olefin comprises at least one member selected from the group consisting of butene-1, hexene-1, and octene-1, i.e., 1-butene, 1-hexene, and 1-octene, respectively. Yet still most preferably, the alpha-olefin comprises octene-1, and/or a blend of hexene-1 and butene-1.

Processes for preparing homogeneous polymers are disclosed in U.S. Pat. No. 5,206,075, U.S. Pat. No. 5,241,031, and PCT International Application WO 93/03093, each of which is hereby incorporated by reference thereto, in its entirety. Further details regarding the production and use of one species of homogeneous ethylene/alpha-olefin copolymers is disclosed in U.S. Pat. No. 5,206,075, to HODGSON, Jr.; U.S. Pat. No. 5,241,031, to MEHTA; PCT International Publication Number WO 93/03093, in the name of Exxon Chemical Company; PCT International Publication Number WO 90/03414, in the name of Exxon Chemical Patents, Inc., all four of which are hereby incorporated in their entireties, by reference there. Still another species of homogeneous ethylene/alpha-olefin copolymers, generally referred to as long-chain-branched homogeneous ethylene/alpha-olefin copolymers, is disclosed in U.S. Pat. No. 5,272,236, to LAI, et. al., and U.S. Pat. No. 5,278,272, to LAI, et. al., both of which are hereby incorporated in their entireties, by reference thereto.

As used herein, the term "polyolefin" refers to any polymerized olefin, which can be linear, branched, cyclic, aliphatic, aromatic, substituted, or unsubstituted.

As used herein, the phrases "inner layer" and "internal layer" refer to any film having its two principal surfaces with other layers of the multilayer film.

As used herein, the phrase "outer layer" refers to any film layer, of a multilayer film, having only one of its principal surfaces directly adhered to another layer of the film.

As used herein, the phrase "directly adhered", as applied to film layers, is defined as adhesion of the subject film layer to the object film layer, without a tie layer, adhesive, or other layer therebetween. In contrast, as used herein, the word "between", as applied to a film layer expressed as being between two other specified layers, includes both direct adherence of the subject layer between to the two other layers it is between, as well as including a lack of direct adherence to either or both of the two other layers the subject layer is between, i.e., one or more additional layers can be imposed between the subject layer and one or more of the layers the subject layer is between.

As used herein, the term "core", and the phrase "core layer", as applied to multilayer films, refer to any internal film layer which has a primary function other than serving as an adhesive or compatibilizer for adhering two layers to one another. Usually, the core layer or layers provide the multilayer film with a desired level of strength, i.e., modulus.

As used herein, the phrase "sealant layer", with respect to multilayer films, refers to an outer film layer which is involved in the sealing of the film to itself or another layer. Although the phrase "sealant layer" as herein used refers only to outer film layers, no matter how thin, it should also be recognized that in general, the outer 0.5 mil to 1.0 mil of a film is involved in the sealing of the film to itself or another layer. With respect to packages having only fin-type seals, as opposed to lap seals, the phrase "sealant layer" generally refers to the inside film layer of a package, as well as supporting layers adjacent this sealant layer often being sealed to itself, and frequently serving as a food contact layer in the packaging of foods.

As used herein, the phrase "tie layer" refers to any internal layer having the primary purpose of adhering two layers to one another.

As used herein, the term "lamination", and the phrase "laminated film", refer to the process, and resulting product, made by bonding together two or more layers of film or other materials. Lamination can be accomplished by joining layers with adhesives, joining with heat and pressure, and even spread coating and extrusion coating. Multilayer films can be made via coextrusion and/or lamination.

As used herein, the term "extrusion" is used with reference to the process of forming continuous shapes by forcing a molten plastic material through a die, followed by cooling or chemical hardening. Immediately prior to extrusion through the die, the relatively high-viscosity polymeric material is fed into a rotating screw of variable pitch, which forces it through the die.

As used herein, the term "coextrusion" refers to the process of extruding two or more materials through a single die with two or more orifices arranged so that the extrudates merge and weld together into a laminar structure before chilling, i.e., quenching. Coextrusion can be employed in film blowing, free film extrusion, and extrusion coating processes.

As used herein, the phrase "machine direction", herein abbreviated "MD", refers to a direction "along the length" of the film, i.e., in the direction of the film as the film is formed during extrusion and/or coating.

As used herein, the phrase "transverse direction", herein abbreviated "TD", refers to a direction across the film, perpendicular to the machine or longitudinal direction.

As used herein, "$O_2$-transmission rate", also referred to as "OTR" and "oxygen permeability", is measured according to ASTM D 3985, a test known to those of skill in the film art.

As used herein, the "melt index" of a polymer is the amount, in grams, of a thermoplastic resin which can be forced through an orifice of 0.0825 inch diameter when subjected to a force of 2160 grams in ten minutes at a specified temperature, e.g., 190° C. for many polymers. The test is performed by an extrusion rheometer described in ASTM D 1238.

Figure 1:
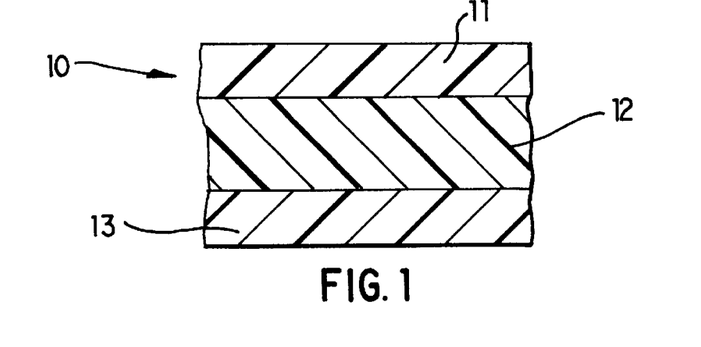
FIG. 1 illustrates an enlarged cross-sectional view of a three-layer multilayer film of the present invention.

FIG. 1 illustrates a cross-sectional view of a preferred embodiment of multilayer film 10 of the present invention. The film comprises first layer 11 (an outer layer), second layer 12 (a core layer), and third layer 13 (also an outer layer). Preferably, the first and third layers 11 and 13 are designed to serve as sealing layers, i.e, comprise a polymer suitable for forming a seal via the application of heat or radiation, as is known to those of skill in the art.

The film of the present invention comprises at least 3 layers. The two outer layers function as sealing layers, while the sole core layer, or at least one of a plurality of inner layers, provides the multilayer film with a desired tensile properties, while permitting a desired level of transmission of oxygen and carbon dioxide therethrough. Preferably, the film comprises from 3 to 15 layers, and more preferably, from 3 to 7 layers, and still more preferably, from 3 to 5 layers. Preferably, the outer layers, i.e., the first and third layers, are of substantially identical chemical composition and are of substantially identical thickness. In general, the core layer should be at least as thick as each of the outer layers, and preferably the core layer is thicker than either of the outer layers.

Although the multilayer film of the present invention can have any total thickness which provides a desired rate of oxygen and carbon dioxide transmission, abuse resistance, tensile strength, etc., preferably, the multilayer film of the present invention has a total thickness (i.e., a combined thickness of all layers), of from about 0.5 to 10 mils (1 mil equals 0.001 inch); more preferably, from about 1 to 5 mils; still more preferably, from 1 to 3 mils; yet still more preferably, from about 1 to 2.5 mils. Most preferably, the multilayer film has a thickness of from about 1.5 to 2 mils.

Preferably, in the multilayer film of the present invention, the two outer layers each make up from about 10 to 80 weight percent of the total weight of the multilayer film. Furthermore, the second, or core layer, can also make up from about 10 to 80 weight percent of the total weight of the film. More preferably, the two outer layers each make up from about 10 to 40 weight percent of the total weight of the multilayer film, and preferably the core layer makes up from about 20 to 80 weight percent of the total weight of the multilayer film.

Preferably, the outer film layers each have a thickness of from about 0.05 to 4 mils; more preferably, from about 0.1 mil to 2 mils; still more preferably, from about 0.1 mil to 1.2 mils; yet still more preferably, from about 0.3 mil to 0.8 mil; even yet still more preferably, from about 0.4 to 0.5 mil.

Preferably, the inner layer (or each of a plurality of inner layers) has a thickness of from about 0.1 mil to 4 mils; more preferably, from about 0.2 mil to 2 mils; still more preferably, from about 0.5 mil to 1 mil.

Preferably, the multilayer film of the present invention has an $O_2$-transmission rate of from about 500 to 50,000 cc/m²/24hr STP; more preferably, from about 1,000 to 20,000 cc/m²/24hr STP; still more preferably, from about 2,000 to 10,000 cc/m²/24hr STP; even yet still more preferably, from about 3,000 to 8,000 cc/m²/24hr STP.

Preferably, at least one of the outer film layers comprises a homogeneous ethylene/alpha-olefin copolymer which permits the multilayer film to have an $O_2$-transmission rate of from about 500 to 50,000 cc/m²/24hr STP. Although the outer film layers, i.e., layers 10 and 13 in the preferred embodiment illustrated in FIG. 1, can have the same or differing chemical composition, preferably the outer layers comprise substantially identical ethylene/alpha-olefin copolymer, more preferably, each comprises a homogeneous ethylene/alpha-olefin copolymer substantially identical to the other. Preferably, the ethylene/alpha-olefin copolymer in the outer layers has a density of less than or equal to about 0.915 g/cc, i.e., up to and including about 0.915 g/cc. Preferably, an antifog agent is present on the outer surface of an outer film layer which later becomes the inside layer of the package. If the package is printed, preferably the printing is on the outer surface of the other outer film layer which forms the outside layer of the package.

In general, the ethylene/alpha-olefin copolymer comprises a copolymer resulting from the copolymerization of from about 80 to 99 weight percent ethylene and from 1 to 20 weight percent alpha-olefin. Preferably, the ethylene/alpha-olefin copolymer comprises a copolymer resulting from the copolymerization of from about 85 to 95 weight percent ethylene and from 5 to 15 weight percent alpha-olefin.

The outer layers can consist essentially of the homogeneous ethylene/alpha-olefin copolymer (or copolymers), or can have still additional polymers blended therewith. However, in each of the outer layers, the homogeneous ethylene/alpha-olefin is preferably present in an amount of at least about 50 weight percent, based on the weight of the respective outer layer. More preferably, the homogeneous ethylene/alpha-olefin is present in an amount of at least about 75 weight percent, based on the weight of the respective outer layer. Still more preferably, the homogeneous ethylene/alpha-olefin is present in an amount of about 100 weight percent, based on the weight of the respective outer layer. If another polymer, i.e., a "secondary polymer", is present in admixture with the homogeneous ethylene/alpha-olefin copolymer, preferably this secondary polymer comprises at least one member selected from the group consisting of polyethylene, ethylene vinyl acetate, ethylene methyl acrylate, ethylene butyl acrylate, ethylene methyl acrylic acid, ionomer, and ethylene/alpha-olefin.

Preferably, the first film layer is directly adhered to a first side of the second film layer, and the third film layer is directly adhered to a second side of the second film layer.

The homogeneous ethylene/alpha-olefin copolymers can be prepared through the use of a metallocene catalyst, and/or any additional single site catalyst. Furthermore, the homogeneous ethylene/alpha-olefin copolymers can be prepared in accordance with any suitable polymerization process, including slurry polymerization, gas phase polymerization, and high pressure polymerization processes. U.S. Pat. No. 5,206,075, U.S. Pat. No. 5,241,031, and PCT International Application WO 93/03093 disclose homogeneous polymers and methods for making same.

Slurry polymerization processes generally use superatmospheric pressures and temperatures in the range of 40°–100° C. In a slurry polymerization, a suspension of solid, particulate polymer is formed in a liquid polymerization medium to which ethylene and comonomers and often hydrogen along with catalyst are added. The liquid employed in the polymerization medium can be an alkane, cycloalkane, or an aromatic hydrocarbon such as toluene, ethylbenzene or xylene. The medium employed should be liquid under the conditions of polymerization, and relatively inert. Preferably, hexane or toluene is employed.

Alternatively, the homogeneous ethylene/alpha-olefin copolymer is prepared by gas-phase polymerization. A gas-phase polymerization process utilizes super-atmospheric pressure and temperature in the range of about 50°–120° C. Gas phase polymerization can be performed in a stirred or fluidized bed of catalyst and product particles in a pressure vessel adapted to permit the separation of product particles from unreacted gases. Ethylene, comonomer, hydrogen and an inert diluent gas such as nitrogen can be introduced or recirculated so as to maintain the particles at temperatures of 50°–120° C. Triethylaluminum may be added as needed as a scavenger of water, oxygen, and other impurities. Polymer product can be withdrawn continuously or semicontinuously, at a rate such as to maintain a constant product inventory in the reactor. After polymerization and deactivation of the catalyst, the product polymer can be recovered by any suitable means. In commercial practice, the polymer product can be recovered directly from the gas phase reactor, freed of residual monomer with a nitrogen purge, and used without further deactivation or catalyst removal.

The homogeneous ethylene/alpha-olefin copolymer can also be produced by a high pressure process, in the presence of a catalyst system comprising a cyclopentadienyl-transition metal compound and an alumoxane compound. It is important, in the high-pressure process, that the polymerization temperature be above about 120° C., but below the decomposition temperature of the polymer product. It is also important that the polymerization pressure be above about 500 bar (kg/cm$^2$). In those situations wherein the molecular weight of the polymer product that would be produced at a given set of operating conditions is higher than desired, any of the techniques known in the art for control of molecular weight, such as the use of hydrogen or reactor temperature, may be used in the process of this invention.

Although the multilayer film of the present invention can have a plurality of inner layers, including a plurality of tie layers as well as a plurality of core layers, in one preferred embodiment, the multilayer film of the present invention has no tie layers, and only one core layer as the sole inner layer of the film.

In FIG. 1, core layer 12 comprises a thermoplastic elastomer. As used herein, the phrase "thermoplastic elastomer" refers to a family of polymers which resemble elastomers in that they are highly resilient and can be repeatedly stretched to at least twice their initial lengths with full, rapid recovery, but are true thermoplastics and thus do not require curing or vulcanization as do most rubbers. Preferred thermoplastic elastomers for use in the present invention include styrene-containing polymers, more preferably styrene/butadiene copolymer.

Preferably, the core layer comprises a styrene-containing elastomeric polymer. Styrene/butadiene block copolymer is a preferred styrene-containing elastomeric polymer. A blend of styrene homopolymer and styrene/butadiene block copolymer is a preferred blend for use in the core layer. Preferably, the blend comprises 5–50% styrene homopolymer, with the balance being styrene-butadiene block copolymer; more preferably, 10–30% styrene homopolymer; still more preferably, 10–20% styrene homopolymer. Preferably, the styrene/butadiene copolymer comprises styrene/butadiene block copolymer comprising butadiene mer in an amount of from about 20 to 40 weight percent, based on block copolymer weight.

As with the homogeneous ethylene/alpha-olefin copolymer polymer of the outer layers of the multilayer film of the present invention, the polymer or polymers in the inner layer, including both core layers as well as tie layers, can be produced in accordance with any suitable polymerization process, including slurry polymerization, gas phase polymerization, and high pressure polymerization processes, as discussed in above, in detail. Furthermore, in addition other catalysts, the polymer(s) in core and/or tie layer or layers can be prepared through the use of a single site catalyst, such as a metallocene catalyst, as discussed above.

Figure 2:
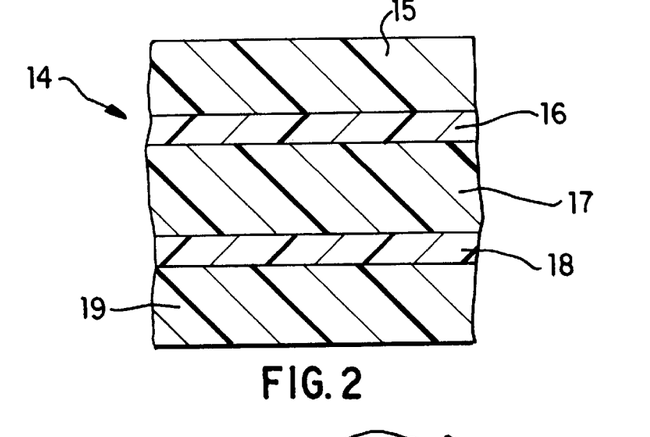
FIG. 2 illustrates an enlarged cross-sectional view of a five-layer multilayer film according to the present invention.

FIG. 2 illustrates a cross-sectional view of a five-layer film 14 according to the present invention, which is an alternative of the preferred multilayer film illustrated in FIG. 1. In FIG. 2, multilayer film 14 is composed of five layers, including first layer 15, second layer 16, third layer 17, fourth layer 18, and fifth layer 19. First layer 15, and fifth layer 19, which are outer layers, are both designed to serve as sealing layers. Inner second layer 16 and inner fourth layer 18 can be polyethylene-based layers, e.g., can comprise an ethylene/alpha-olefin copolymer or propylene/ethylene copolymer, or can be designed to serve as tie layers, or can be high modulus elastomer-containing layers. Third layer 19, also an inner layer, can be a high modulus elastomer containing layer, or a polyethylene-based layer, or even a tie layer. If an antifog agent is used in the film, i.e., a surface active agent, it should be present on an outer surface of an outer film layer which later becomes the inside layer of the package. If the package is printed, the printing is on the outer surface of the other outer film layer, which forms the outside layer of the package.

Although most preferably the multilayer film of the present invention does not comprise a tie layer, in general, the multilayer film of the present invention can comprise one or more tie layers. In general, the tie layer or layers may comprise any polymer which adheres to both the layers which the tie layer is tying together. The composition, number, and thickness of the tie layer or layers are as known to those of skill in the art of films. Tie layers need be only thick enough to effectuate the desired tying function. Preferably, the thickness of the tie layers is from about 0.001 to 0.5 mil., more preferably from about 0.01 to 0.4 mil., and most preferably from about 0.1 to 0.3 mil.

The polymer components used to fabricate multilayer films according to the present invention may also contain appropriate amounts of other additives normally included in such compositions. These include slip agents such as talc, antioxidants, fillers, dyes, pigments and dyes, radiation stabilizers, antistatic agents, elastomers, and the like additives known to those of skill in the art of packaging films. The presence of an antifog agent is a particularly preferred additive for at least one of the outer layers.

Multilayer films in accordance with the present invention can be manufactured using film fabrication technologies well-known in the art. For example, the base film may be extruded into a film using a flat die, or extruded into a film using an annular die, and the heat seal layer formed thereon by solvent deposition, lamination or coextrusion techniques. However, the preferred method of manufacture of the multilayer film of the present invention is via simultaneous coextrusion, in an annular die, of all the layers of the multilayer film, including the outer (sealing) layers, the core layer, and optionally, the one or more tie layers.

Figure 3:
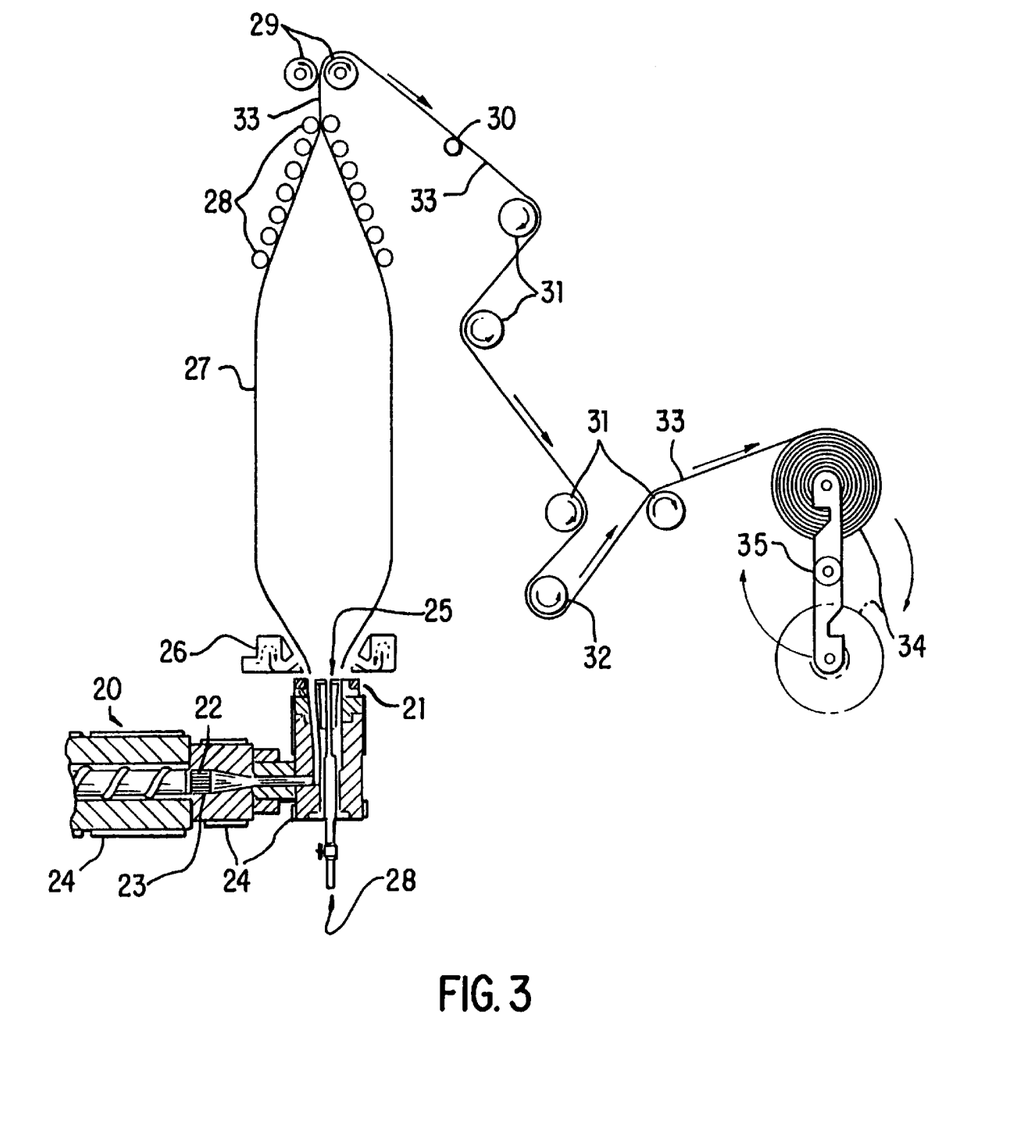
FIG. 3 illustrates a schematic view of a process according to the present invention.

FIG. 3 illustrates a schematic view of a process according for making the film according to the present invention, i.e., either multilayer film 10 or multilayer film 14, both of which are in accordance with the present invention. Although for the sake of simplicity only one extruder 20 is illustrated in FIG. 3, there are preferably at least 2 extruders, and more preferably, at least three extruders. That is, preferably at least one extruder, and more preferably two extruders, supply molten polymer to coextrusion die 21 for the formation of, for example, outer layers 11 and 13 as illustrated in FIG. 1, and at least one additional extruder supplied molten polymer to coextrusion die 21 for the formation of, for example, core layer 12 as illustrated in FIG. 1. Each of the extruders is supplied with polymer pellets suitable for the formation of the respective layer it is extruding. The extruders subject the polymer pellets to sufficient pressure and heat to melt the polymer and thereby prepare it for extrusion through a die.

Taking extruder 20 as an example, each of the extruders is preferably equipped with a screen pack 22, a breaker plate 23, and a plurality of heaters 24. Each of the coextruded film layers is extruded between mandrel 25 and die 21, and the extrudate is cooled by cool air flowing from air ring 26. The resulting blown bubble is thereafter guided into a collapsed configuration by nip rolls 29, via guide rolls 28. The collapsed tube is optionally passed over treater bar 30, and is thereafter passed over idler rolls 31, and around dancer roll 32 which imparts tension control to collapsed tube 33, after which the collapsed tube is wound into roll 34 via winding mechanism 35.

Although the multilayer film of the present invention is preferably not irradiated, optionally the film may be irradiated. In the irradiation process, the film is subjected the film to an energetic radiation treatment, such as corona discharge, plasma, flame, ultraviolet, X-ray, gamma ray, beta ray, and high energy electron treatment, which induce cross-linking between molecules of the irradiated material.

Radiation dosages are referred to herein in terms of the radiation unit "RAD", with one million RADS, also known as a megarad, being designated as "MR". A suitable radiation dosage of high energy electrons is in the range of up to about 12 MR, more preferably about 2 to about 9 MR, and still more preferably, about 3 MR. Preferably, irradiation is carried out by an electron accelerator and the dosage level is determined by standard dosimetry methods.

Figure 4:
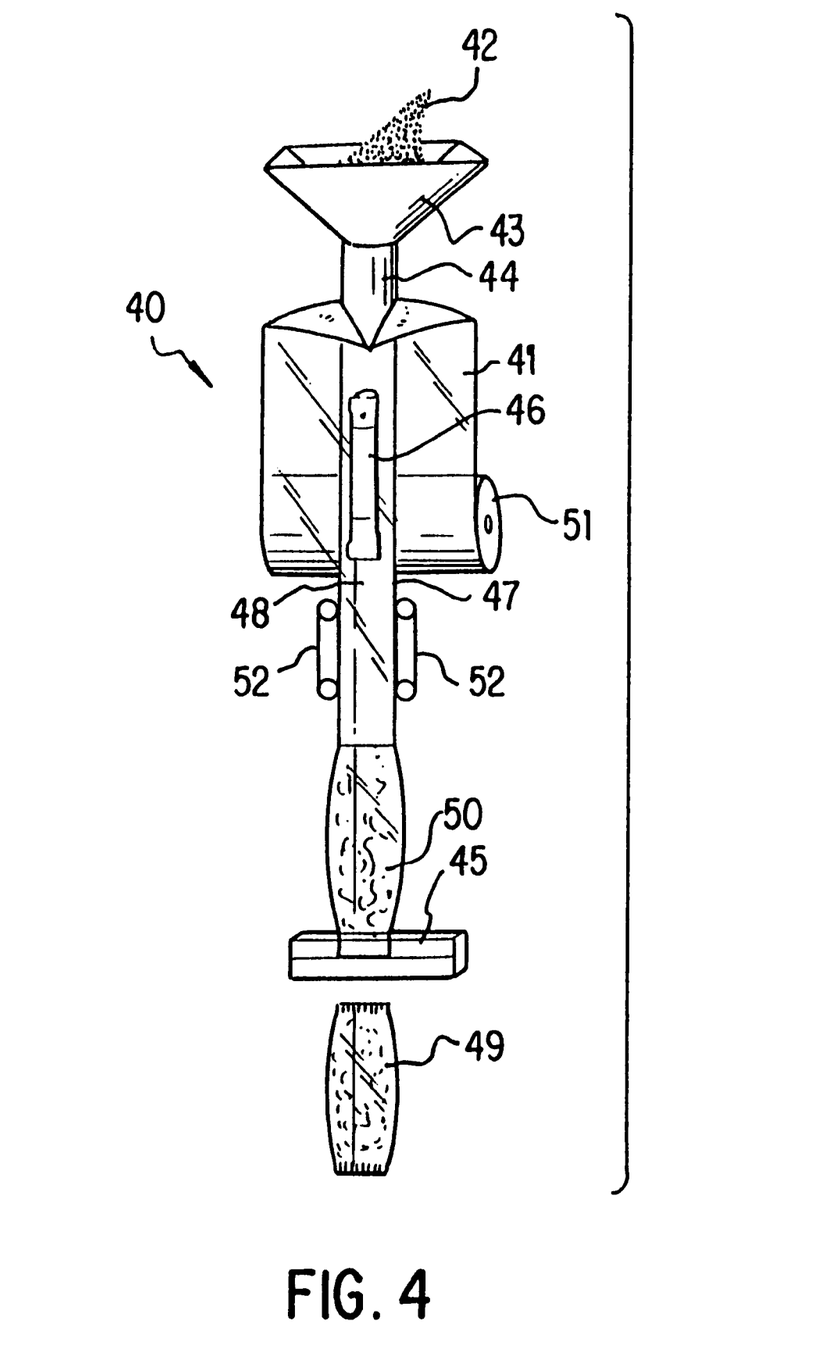
FIG. 4 illustrates a vertical form fill and seal apparatus to be used in packaging process according to the present invention.

FIG. 4 illustrates a vertical form fill and seal apparatus to be used in packaging process according to the present invention. Vertical form fill and seal equipment is well known to those of skill in the packaging arts. The following documents disclose a variety of equipment suitable for vertical form fill and seal: U.S. Pat. No. 2,956,383; U.S. Pat. No. 3,340,129 to J. J. GREVICH; U.S. Pat. No. 3,611,657, to KIYOSHI INOUE, et. al.; U.S. Pat. No. 3,703,396, to INOUE, et. al.; U.S. Pat. No. 4,103,473, to BAST, et. al.; U.S. Pat. No. 4,506,494, to SHIMOYAMA, et. al.; U.S. Pat. No. 4,589,247, to; U.S. Pat. No. 4,532,752, to TAYLOR; U.S. Pat. No. 4,532,753, to KOVACS; U.S. Pat. No. 4,571,926, to SCULLY; and Great Britain Patent Specification No. 1 334 616, to de GROOT, et. al., each of which is hereby incorporated in its entirety, by reference thereto.

In FIG. 4, a vertical form fill and seal apparatus 40 is schematically illustrated. Apparatus 40 utilizes multilayer film 41 according to the present invention. Product 42, to be packaged, is supplied to apparatus 40 from a source (not illustrated), from which a predetermined quantity of product 42 reaches upper end portion of forming tube 44 via funnel 43, or other conventional means. The packages are formed in a lower portion of apparatus 40, and flexible sheet material 41 from which the bags or packages are formed is fed from roll 51 over certain forming bars (not illustrated), is wrapped about forming tube 44, and is provided with longitudinal seal 47 by longitudinal heat sealing device 46, resulting in the formation of vertically-oriented tube 48. End seal bars 45 operate to close and seal horizontally across the lower end of vertically-sealed tube 48, to form pouch 50 which is thereafter immediately packed with product 42. Film drive belts 52, powered and directed by rollers, as illustrated, advance tube 48 and pouch 50 a predetermined distance, after which end seal bars 45 close and simultaneously seal horizontally across the lower end of vertically-sealed tube 48 as well as simultaneously sealing horizontally across upper end of sealed pouch 49, to form a product packaged in sealed pouch 49. The next pouch 50, thereabove, is then filled with a metered quantity of product 42, forwarded, and so on. It is also conventional to incorporate with the end seal bars a cut-off knife (not shown) which operates to sever a lower sealed pouch 49 from the bottom of upstream pouch 50.

In carrying out the packaging process of the present invention, preferably the vertical form fill and seal machine forms, fills, and seals at least 15 packages per minute, preferably from about 15 to 45 packages per minute, without substantial burn through of the film at the seals.

Although the packaging process may be carried out with any film according to the present invention, the packaging process is preferably carried out using a preferred film according to the present invention. Preferably, the film is sealed at the lowest possible temperature at which relatively strong seals are produced. In general, the film is sealed at a temperature of from about 70° C. to 150° C.; more preferably, from about 80° C. to 140° C., and still more preferably, from about 90° C. to 130° C.

In general, the packaging process is carried out with the packaging of an oxygen-sensitive product. Preferably, the oxygen-sensitive product comprises at least one cut vegetable or fruit selected from the group consisting of lettuce, cabbage, broccoli, green beans, cauliflower, spinach, kale, carrot, onion, pepper, corn, radish, endive, chard, chicory, radicchio, greens, peas, squash, escarole, brussel sprout, mushroom, melons and berries; more preferably, at least one member selected from the group consisting of lettuce, cabbage, broccoli, cauliflower, kale, carrot, onion, radish, endive, chard, chicory, radicchio, and escarole, where the film has an oxygen permeability of from about 2000 to 10,000 cc/m$^2$/24 hr STP.

Figure 5:
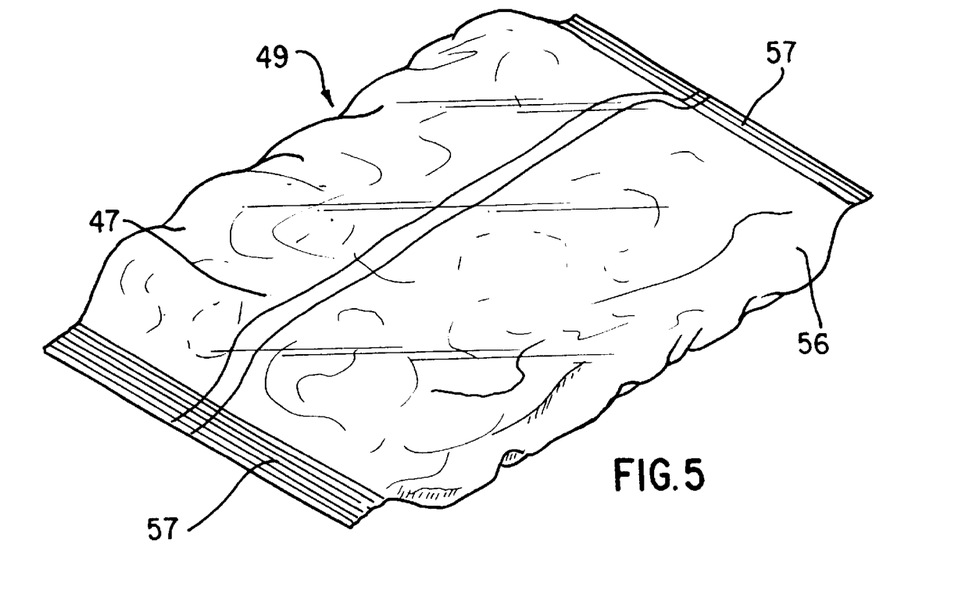
FIG. 5 illustrates a packaged product of the present invention, the product being packaged in the multilayer film of the present invention.

FIG. 5 illustrates one embodiment of a packaged product 49 of the present invention, the product being packaged in sealed pouch 56 having vertical seal 47 and end seals 57. Package 56 is a multilayer film of the present invention as produced in a vertical form fill and seal apparatus, in accordance with the present invention as described above.

In general, the product in the package can be any oxygen-sensitive product, as described above. Preferably, the oxygen-sensitive product comprises at least one cut vegetable selected from the group consisting of lettuce, cabbage, broccoli, green beans, cauliflower, spinach, kale, carrot, onion, pepper, corn, radish, endive, chard, chicory, radicchio, greens, peas, squash, escarole, brussels sprout, mushroom, melons and berries; more preferably, at least one member selected from the group consisting of lettuce, cabbage, broccoli, cauliflower, kale, carrot, onion, radish, endive, chard, chicory, radicchio, and escarole, where the film has an oxygen permeability of from about 2000 to 10,000 cc/mil/m²/24 hr STP., and, still more preferably, an oxygen permeability of from about 3000 to 8000 cc/m²/24 hr STP.

The invention is illustrated by the following examples, which are provided for the purpose of representation, and are not to be construed as limiting the scope of the invention. Unless stated otherwise, all percentages, parts, etc. are by weight.

EXAMPLES 1–6

A series of coextruded, multilayer films were produced on conventional hot blown film equipment using a multilayer annular die, to produce films having an A/B/A-type structure. The films had average thicknesses of from about 1.5 to 2.0 mils. Each outer layer A was designed to serve as a sealing layer. Each outer layer was composed of a AFFINITY PL 1880™ metallocene-catalyzed ethylene/octene copolymer having a density of about 0.902 gm/cc, and a melt index of about 1.0 gr/10 min (using Condition E of ASTM D-1238), obtained from The Dow Chemical Co., 2040 Dow Center, Midland, Mich. 48674 (hereinafter referred to as "MCPE1"). Each outer layer had an average thickness of about 0.5 mils. For each of the outer film layers A, MCPE1 was preblended with a "masterbatch," i.e., either: (a) FSU93E™ slip/antiblock concentrate, obtained from A. Schulman of Akron, Ohio (hereinafter, "MB1"), or (b) FSU255E™ slip/antiblock concentrate, also obtained from A. Schulman of Akron, Ohio (hereinafter, "MB2"). The masterbatch was added to each outer layer, in an amount of about 4 to 6 weight percent, based on weight of the outer layer. The slip and antiblock agents served to provide easy separation of the film plys at the winder, and for good machinability on the VFFS packaging equipment.

The B-layer, i.e., the only inner film layer, contained a styrene/butadiene copolymer or a blend of styrene-butadiene copolymer and homogeneous polystyrene. Two styrene/butadiene copolymers were evaluated, the first (i.e., "SBC1") being KK36™ styrene/butadiene copolymer having 75 percent by weight styrene, a melt index of 8.0 (Condition G of ASTM D-1238) and a density of 1.01 g/cc, obtained from Phillips 66 Company, of Pasadena, Tex. The second styrene/butadiene copolymer evaluated (i.e., "SBC2") was STYROLUX 684D®, obtained from BASF Corporation of 3000 Continental Drive, N., Mount Olive, N.J. The STYROLUX 684D® had a density of 1.01 g/cc and a melt index of 8.5 gm/10 min (using Condition G of ASTM method D-1238).

The polymer formulations for the A-layers and B-layer were then fed into the hoppers of extruders which fed an annular coextrusion die. The materials were coextruded through the die, exited the die, and were blown to a desired width while simultaneously being cooled with an air ring. The cooled film was then collapsed, ply separated, and wound on cores for further processing.

Table I, below, provides the structure, total thickness and layer thicknesses, for each of the films of Examples 1–6. Table II provides the longitudinal and transverse modulus, kinetic coefficient of friction, haze, gloss, and transmission rate data.

EXAMPLES 7–9

A series of coextruded, multilayer films were produced on conventional hot blown film equipment equipped with a multilayer annular die, to produce films having an A/B/C/B/A-type structure. The films had average total thicknesses of from about 1.5 to 2.0 mils. For each film, each outer layer A served as a sealing layer and was composed of MCPE1 in an amount of about 95 weight percent, based on weight of the outer layer. Each outer layer A had an average thickness of about 0.5 mils. For each of the outer film layers, the metallocene-catalyzed polyethylene was preblended with MB1 (in an amount of about 5 weight percent, based on weight of the outer layer. MB1 served to allow easy separation of the film plys at the winder, and for good machinability on the VFFS packaging equipment. Each of the B-layers contained SBC-1 in an amount of 100 weight percent, based on weight of the layer. The C-layer contained ESCORENE PD 9302® propylene/ethylene copolymer (hereinafter "EPC" ), obtained from the Exxon Chemical Company, of Houston, Tex. This EPC had an ethylene content of about 3.3 weight percent (based on weight of EPC), a density of 0.895, and a melt flow rate of 3.8 g/10 min (Condition L of ASTM D-1238). The C layer contained EPC in an amount of about 100 weight percent, based on weight of the layer.

The polymer formulations for the A-layers, B-layers and C-layer were then fed into the hoppers of extruders which fed the coextrusion die. The materials were coextruded through an annular coextrusion die, exited the die, and were blown to a desired width while simultaneously being cooled with an air ring. The cooled film was then collapsed, ply-separated, and wound onto cores for further processing.

For Examples 7–9, Table I, below, provides the structure, total thickness and layer thicknesses; and Table II provides the longitudinal and transverse modulus, kinetic coefficient of friction, haze, gloss, and transmission rate data.

EXAMPLES 10 & 11 (Comparative)

Two coextruded, multilayer films were produced on conventional hot blown film equipment equipped with a multilayer annular die, to produce films having an A/B/A-type structure. The films had average thicknesses of 1.8 mils and 1.3 mils, respectively. For each film, the two outer layers A, each of which served as a sealing layer, were each composed of MCPE1 (96 weight percent) and MB1 (4 weight percent). As for the films of Examples 1–6, MB1 was added to allow easy separation of the film plys at the winder, and for good machinability on the VFFS packaging equipment. The B-layer, i.e., the only inner layer in the films of Examples 10 and 11, was composed of 100 percent EPC.

The polymer formulations for the A-layers and B-layer were then fed into the hoppers of extruders which fed an annular coextrusion die. The materials were coextruded through the die, exited the die, and were blown to a desired width while simultaneously being cooled with an air ring. The cooled film was then collapsed, ply-separated, and wound on cores for further processing. For Examples 10 and 11, Table I, below, provides the structure, total thickness and various layer thicknesses, and Table II provides the longitudinal and transverse modulus, kinetic coefficient of friction, haze, gloss, and transmission rate data.

TABLE I

| Film of Example No. | Film Layer Composition & Structure | Film Layer Thickness (mils) |
|---|---|---|
| 1 | 96% MCPE1 + 4% MB1/SBC1/96% MCPE1 + 4% MB1 | .5/.7/.5 |
| 2 | 95% MCPE1 + 5% MB2/SBC1/95% MCPE1 + 5% MB2 | .5/.5/.5 |
| 3 | 94% MCPE1 + 6% MB1/SBC1/94% MCPE1 + 6% MB1 | .5/.7/.5 |
| 4 | 95% MCPE1 + 5% MB1/SBC1/95% MCPE1 + 5% MB1 | .5/.7/.5 |
| 5 | 95% MCPE1 + 5% MB1/SBC2/95% MCPE1 + 5% MB1 | .6/.9/.5 |
| 6 | 95% MCPE1 + 5% MB1/90% SBC2 + 10% PS/95% MCPE1 + 5% MB1 | .5/.8/.5 |
| 7 | 95% MCPE1 + 5% MB1/SBC1/EPC/SBC1/95% MCPE1 + 5% MB1 | .3/.1/.7/.1/.3 |
| 8 | 95% MCPE1 + 5% MB1/SBC1/EPC/SBC1/95% MCPE1 + 5% MB1 | .4/.3/.8/.3/.3 |
| 9 | 95% MCPE1 + 5% MB1/SBC1/EPC/SBC1/95% MCPE1 + 5% MB1 | .3/.2/.5/.2/.3 |
| 10 | 96% MCPE1 + 4% MB1/EPC/96% MCPE1 + 4% MB1 | .5/.8/.5 |
| 11 | 96% MCPE1 + 4% MB1/EPC/96% MCPE1 + 4% MB1 | .4/.5/.4 |

TABLE II

| Ex. No. | Longitudinal Modulus (psi) | Transverse Modulus (psi) | Kinetic COF | Haze (%) | Gloss (at 45°) | $O_2$TR (cc/m2 24 hr. STP) | $CO_2$TR (cc/m2 24 hr. STP) | MVTR (gm/100 in2 24 hr. STP) |
|---|---|---|---|---|---|---|---|---|
| 1 | 90,0000 | 69,000 | 0.17 | 6.1 | 73 | 7,300 | 25,000 | 1.8 |
| 2 | 76,000 | 55,000 | 0.13 | 11.9 | 60 | 6,500 | 23,000 | 1.5 |
| 3 | 99,000 | 74,000 | 0.12 | 6.0 | 74 | 7,200 | 25,000 | 1.6 |
| 4 | 93,000 | 72,000 | 0.44 | 4.3 | 77 | 7,800 | 25,000 | 1.9 |
| 5 | 110,000 | 90,000 | 0.43 | 6.5 | 73 | 5,900 | 23,000 | 1.6 |
| 6 | 112,000 | 88,000 | 0.43 | 6.3 | 71 | 6,600 | 24,000 | 1.9 |
| 7 | 87,000 | 75,000 | 0.17 | 6.4 | 72 | 3,700 | 14,000 | 0.81 |
| 8 | 106,000 | 85,000 | 0.36 | 5.9 | 75 | 3,200 | 13,000 | 0.74 |
| 9 | 87,000 | 67,000 | 0.36 | 5.6 | 74 | 5,600 | 17,000 | 1.2 |
| 10 | 54,000 | 54,000 | 0.13 | 6.3 | 70 | 4,600 | 14,000 | 0.72 |
| 11 | 48,000 | 52,000 | 0.14 | 6.4 | 68 | 6,900 | 18,000 | 1.01 |

Tables III and IV, below, $O_2$-concentration data (Table III), and $CO_2$-concentration data (Table IV) taken from two independent evaluations of the films of Examples 3, 5, 6, and 11. In both studies, one pound broccoli florets were packaged in the films, for the purpose of ascertaining and comparing the product shelf-life in the films. In both cases, materials containing styrene/butadiene copolymer in the core, i.e., the films of Examples 3, 5, and 6, were effective in maintaining good product quality while providing the desired aesthetics and machinability properties needed for a retail application of a packaged product prepared using a vertical-form-fill-and-seal ("VFFS") process. The analysis of packaged products utilizing the films of Examples 3, 5, and 6 revealed ideal gas transmission rates, with particular regard for carbon dioxide and water vapor transmission rates. Studies suggest that the best product quality, in terms of appearance, flavor, and odor, is obtained if throughout the shelf-life there is an average $O_2$-concentration of 1 to 3 percent, and an average $CO_2$-concentration of 5 to 10 percent. It is believed that these properties are of significant benefit to extending the shelf-life of highly perishable commodities such as fresh-cut broccoli.

As is apparent from the data set forth in Table III, the $O_2$-concentration of the various packages was similar, with the differences, in most cases, having no statistical significance. However, as set forth in Table IV, the $CO_2$-concentrations inside the packages utilizing the films of Examples 3, 5, and 6 range from about 40 to 59 percent of the $CO_2$-concentration inside the package made using the film of comparative Example 11. This result is advantageous for the films according to the present invention, since a high $CO_2$-concentration in a packages produces an off-flavor as well as an off-odor. In fact, during the study it was observed that packages made from the comparative film of Example 11 developed an off-odor faster and more pronounced than packages made from the films of Examples 3, 5, and 6. Also, it was noticed that packages made from films of Examples 3, 5, and 6 had significantly less moisture therein, because of their higher water vapor transmission rate which prevents slime growth on the product.

TABLE III

Percent Mean $O_2$-Concentration Measured in One Pound Samples of Broccoli Florets Packaged in Various Films and Stored at 40° F.

| Elapsed Days | Film of Example 3 | Film of Example 5 | Film of Example 6 | Film of Example 11 |
|---|---|---|---|---|
| 3 | 1.2 | 1.6 | 1.2 | 1.2 |
| 7 | 1.5 | 1.1 | 1.2 | 1.1 |
| 14 | 2.0 | 1.3 | 1.2 | 1.1 |

TABLE IV

Percent Mean $CO_2$-Concentration Measured in One Pound Samples of Broccoli Florets Packaged in Various Films and Stored at 40° F.

| Elapsed Days | Film of Example 3 | Film of Example 5 | Film of Example 6 | Film of Example 11 |
|---|---|---|---|---|
| 3 | 5.7 | 7.1 | 6.8 | 12 |
| 7 | 5.0 | 5.2 | 4.6 | 11 |
| 14 | 4.3 | 4.6 | 3.8 | 9.6 |

In addition to the $O_2$ and $CO_2$ concentration data provided immediately above, "machinability" tests were also performed. These machinability tests were designed to determine how the film performed in FFS machinery. From the machinabilty test results, which were qualitative, it was determined that films possessing a modulus of from about 80,000 to 100,000 psi, and a coefficient of friction ("COF") less than 0.4, performed best in terms of formability and tracking. Formability refers to the ability of the film to form around the forming tube without wrinkling; tracking refers to the ability of the film to be forwarded through the FFS without the side edges of the film "wandering" to a degree that the back seal cannot consistently be formed.

The films of Examples 3, 5, 6, 10 and 11 were compared on a Hayssen Ultima CMB model 12/19HPR vertical FFS machine. All films performed acceptably. However, the films of Examples 3, 5 and 6 put-performed film of comparative Examples 10 and 11, i.e., in terms of forming and tracking. The films of Examples 3, 5 and 6 laid flatter on the seal bars, and therefore, relative to the films of comparative Examples 10 and 11, had significantly fewer wrinkles in the seal areas. Furthermore, relative to the films of comparative Examples 10 and 11, the films of Examples 3, 5, and 6 exhibited superior tracking, resulting in a more consistent back seal. However, in order to seal through wrinkles when they occurred, the films of Examples 3, 5, and 6 did require either (a) a longer sealing time, or (b) more heat. The film of Example 3 machined slightly better than the films of Examples 5 and 6, because the film of Example 3 had a lower coefficient of friction.

Table V, below, provides the commercial name, density, melt index, and supplier identity for various resins used in the above Examples.

| Film of Example No. | Film Layer Composition and Structure | Film Layer Thickness | OTR cc/m$^2$/day (STP) |
|---|---|---|---|
| 12 | SBC3/MCPE2/adhesive/MCPE2 | 0.7/0.2/0.10/1.0 | 5600 |

The film of Example 12 (comparative) has been reported as often being difficult to machine as a result of edge curl, which has been discovered to be directly related to the asymmetrical nature of this film. Additionally, the edge curl prevents film splicing and complicates film threading as a result of poor film flatness. Fin sealing is also required as a result of the asymmetry of this comparative structure; the film of Example 12 (comparative) was not suitable for the formation of a lap seal. Relative to lap seals, fin seals are more difficult to make, and require greater film width to compensate for any inconsistencies in film tracking. The edge curl of this comparative film caused the film to exhibit diminished consistency of back seal formation, resulting in missed seals or insufficient sealing area.

In contrast, the film of Examples 3, 5, and 6 of the present invention is symmetrical and flat. It spliced and threaded easily, and could be used for the formation of lap seals. There is a predominant opinion in the produce and vertical equipment industries that materials comprising polyethylene as the outer layer of the package are not machinable on

TABLE V

| Component Identity | Commercial Name | Density g/cc | Melt Index (g/10 min) | Supplier Identity |
|---|---|---|---|---|
| MCPE1 | AFFINITY PL 1880 (TM) | 0.902 | 1.0 (ASTM D-1238 condition E) | The Dow Chemical Co., 2040 Dow Center, Midland, MI 48674 |
| MCPE2 | EXACT 3028 (TM) | — | — | Exxon Chemical Co. P.O. Box 3272 Houston, TX 77253-3272 |
| EPC | ESCORENE ® PD 9302 | 0.895 | 3.8 (ASTM D-1238 condition L) | Exxon Chemical Co. P.O. Box 3272 Houston, TX 77253-3272 |
| SBC1 | K-Resin ® KK36 | 1.01 | 7.5 (ASTM D-1238 condition G) | Phillips 66 Co. P.O. Box 58966 Houston, TX 77258-8966 |
| SBC2 | Styrolux ® 684D | 1.01 | 8.5 (ASTM D-1238 condition G) | BASF Corporation 3000 Continental Drive, N. Mount Olive, NJ 07828 |
| SBC3 | KRO5 Styrene Butadiene copolymer | — | | Phillips 66 Co. P.0. Box 58966 Houston, TX 77258-8966 |
| MB1 | POLYBATCH ® FSU-93-E | 1.10 | 11 (ASTM D-1238 Condition E) | A. Schuknan, Inc. Akron, Ohio |

EXAMPLE 12 (Comparative)

A multilayer film produced by Cypress Packaging, Inc. of Rochester, N.Y. was obtained and compared with the a film according to the present invention, more particularly, the films of Examples 3, 5, and 6, above. The comparative film, from Cypress Packaging, Inc., was believed to be the same as, or substantially the same as, the film disclosed in Example 2 of PCT WO 94/25271, in the name of Cypress Packaging, Inc., published Nov. 10, 1994, naming D. C. Fischer et al. as inventors. Table VI, below, provides the arrangement and composition of the various film layers, as well as the OTR of the comparative film.

vertical FFS systems equipped with constant heal seal bars because of the belief that such structures would adhere to the seal bar limiting if not preventing the ability to seal. This phenomenon is overcome by the use of TEFLON® polytetrafluoroethylene coated seal bars and air cooling of the seal area following seal initiation. This allows for constant heat sealing of a balanced structure comprised of ethylene/alpha-olefin copolymer as outer layers of the film. Sealing is determined by the interaction of time, temperature, and pressure. The film of the invention requires less seal time and temperature (25° to 50° F.) than the comparative material.

Although the present invention has been described with reference to particular means, materials, and embodiments, it should be noted that the invention is not to be limited to the particulars disclosed, and extends to all equivalents within the scope of the claims.

What is claimed is:

1. A film comprising:
   a) a first outer layer comprising a homogeneous ethylene/α-olefin copolymer;
   b) a second outer layer comprising an ethylene/α-olefin copolymer; and
   c) disposed between said first and second outer layers, an inner layer comprising a blend of styrene/butadiene copolymer and styrene homopolymer, said film having an $O_2$-transmission rate of from about 500 to 50,000 $cc/m^2$ 24 hr. at standard temperature and pressure.

2. The film of claim 1 wherein said ethylene/α-olefin copolymer of said second outer layer is homogeneous.

3. The film of claim 2 wherein said homogeneous ethylene/α-olefin copolymer of said second outer layer is the same as said homogeneous ethylene/α-olefin copolymer of said first outer layer.

4. The film of claim 1 wherein said first outer layer further comprises at least one surface-active agent on the outside surface thereof.

5. The film of claim 4 wherein said at least one surface active agent is one or more of an ester of an aliphatic alcohol, a polyether, a polyhydric alcohol, an ester of a polyhydric alcohol, and a polyethoxylated aromatic alcohol.

6. The film of claim 4 wherein said surface active agent is an antifogging agent.

7. The film of claim 1 wherein said homogeneous ethylene/α-olefin copolymer has a density of less than about 0.915 $g/cm^3$.

8. The film of claim 7 wherein said homogeneous ethylene/α-olefin copolymer comprises from about 80 to 99 weight percent mer units derived from ethylene and from about 1 to 20 weight percent mer units derived from at least one of 1-butene, 1-hexene and 1-octene.

9. The film of claim 8 wherein said homogeneous ethylene/α-olefin copolymer comprises from about 85 to 95 weight percent mer units derived from ethylene and from about 5 to 15 weight percent mer units derived from at least one of 1-octene and a blend of 1-butene and 1-hexene.

10. The film of claim 1 wherein said styrene/butadiene copolymer is a block copolymer comprising from about 20 to 40 weight percent mer units derived from butadiene.

11. The film of claim 1 wherein said styrene homopolymer is present in an amount of from about 5 to about 50 weight percent of said inner layer.

12. The film of claim 1 wherein the layers of said film are palindromic.

13. The film of claim 1 wherein the layers of said film are coextruded.

14. A packaged product comprising:
   a) a product, and
   b) a package comprising the film of claim 1.

15. The packaged product of claim 14 wherein said package further comprises a tear notch.

16. A process for packaging an $O_2$-sensitive product comprising:
   a) to the film of claim 11 in a vertical form-fill-and-seal apparatus, forming
      1) a longitudinal seal along at least a segment of adjacent substantially vertically-oriented edge portions of said film so as to form a sealed tube segment, and
      2) a bottom seal across a collapsed lower end portion of said sealed tube segment so as to form a pouch;
   b) adding to said pouch an appropriate quantity of said product; and
   c) forming a top seal across a collapsed upper end portion of said pouch to seal said pouch so as to form said package around said product.

17. The process of claim 16 wherein said product comprises a cut vegetable, said film having an $O_2$-transmission rate of from about 3,000 to 8,000 $cc/m^2$ 24 hr at standard temperature and pressure.

18. A film comprising:
   a) a first outer layer comprising a homogeneous ethylene/α-olefin copolymer;
   b) a first inner layer;
   c) a second inner layer;
   d) a third inner layer, and
   e) a second outer layer comprising an ethylene/αolefin copolymer, said second inner layer being between said first and third inner layers and wherein said first inner layer comprises a polymer comprising mer units derived from styrene, said third inner layer comprises a polymer comprising mer units derived from styrene, and said second inner layer comprises a polyolefin.

19. The film of claim 18 wherein said polymer comprising mer units derived from styrene from said third inner layer compositionally is the same as that of said polymer comprising mer units derived from styrene from said first inner layer.

20. The film of claim 18 wherein said polyolefin comprises mer units derived from propylene.

21. The film of claim 20 wherein said polyolefin further comprises from about 0.1 to 6 weight percent mer units derived from ethylene.

22. The film of claim 18 wherein the layers that comprise a polymer comprising mer units derived from styrene comprise a styrene/butadiene copolymer.

23. The film of claim 22 wherein said styrene/butadiene copolymer is a block copolymer comprising (from about 20 to 40 weight percent mer units derived from butadiene.

24. The film of claim 22 wherein said layers further comprise styrene homopolymer.

25. A packaged product comprising:
   a) a product, and
   b) a package comprising the film of claim 18.

26. The packaged product of claim 25 wherein said package further comprises a tear notch.

* * * * *